United States Patent

[11] 3,574,339

| | | |
|---|---|---|
| [72] | Inventor | Thomas F. Sarah<br>Akron, Ohio |
| [21] | Appl. No. | 772,558 |
| [22] | Filed | Nov. 1, 1968 |
| [45] | Patented | Apr. 13, 1971 |
| [73] | Assignee | Shakespeare of Arkansas Inc.<br>Fayetteville, Ark. |

[54] BRAKE ADJUSTING MEANS FOR FLY REELS
8 Claims, 5 Drawing Figs.

[52] U.S. Cl. .................................................. 242/84.5, 188/74
[51] Int. Cl. .................................................. A01k 89/02
[50] Field of Search .......................................... 242/84.5, 84.5 (A), 84.51, 84.51 (A), 84.44, 84.45, 84.46; 188/74, 83

[56] References Cited
UNITED STATES PATENTS

| | | | |
|---|---|---|---|
| 2,059,765 | 11/1936 | Adams | 242/84.5X |
| 2,993,660 | 7/1961 | Parks | 242/84.51 |
| 3,044,730 | 7/1962 | Yeada | 242/84.5(A)X |
| 3,123,319 | 3/1964 | Hull | 242/84.51(A) |

Primary Examiner—Billy S. Taylor
Attorney—Hamilton, Cook, Renner and Kenner

ABSTRACT: A fly reel has a line spool rotatably mounted within a housing. A brake means to resist rotation of the spool in at least one direction employs a drum rotatable with the spool in at least that direction in which rotational resistance is desired. A shoe means incorporated on a brake arm supported from the housing frictionally engages the drum and an adjusting means selectively varies the pressure with which the shoe engages the drum. The adjusting means comprises a wedge means that transmits pressure force from a thrust means to a reaction surface on the side of the brake arm opposite the shoe means. A control means varies the span of the wedge means between the thrust means and the reaction surface and thereby the pressure force applied by the shoe means against the drum.

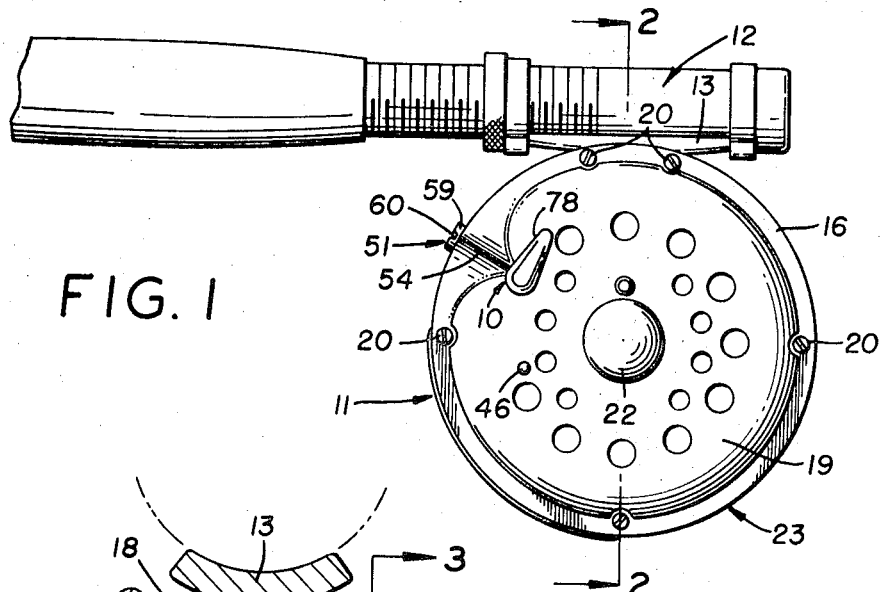
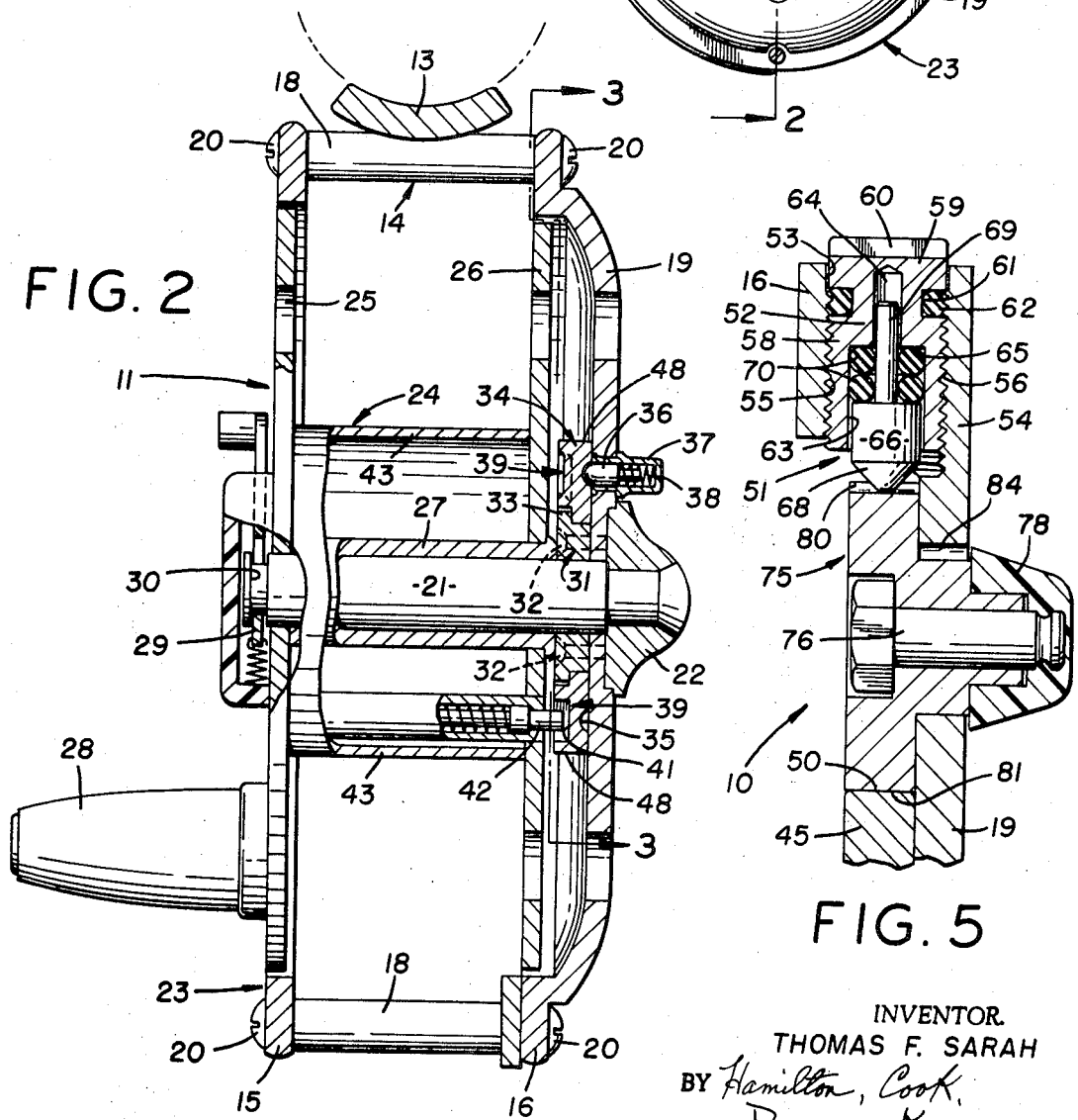
FIG. 1
FIG. 2
FIG. 5
INVENTOR.
THOMAS F. SARAH
BY Hamilton, Cook,
Renner & Renner
ATTORNEYS INVENTOR.
THOMAS F. SARAH
BY Hamilton, Cook,
Renner & Kenner
ATTORNEYS

BRAKE ADJUSTING MEANS FOR FLY REELS

BACKGROUND OF THE INVENTION

The present invention relates generally to a variably adjustable brake mechanism for a fly reel.

Fly reels, historically designated "trout reels," are constructed in three basic styles: automatic, single action, and multiple action. Irrespective of the style, the purpose of a fly reel is simply to provide a spool on which the line can be stored and to do so in such a way that the line can be readily stripped therefrom or retrievingly wound thereon.

Briefly to describe the three basic styles, the automatic fly reel has a spring operated spool which retrieves line automatically whenever you press a line retrieve lever. The single action fly reel is so named because the line spool makes one complete revolution for each turn of the handle. The multiple action reel provides more than one revolution of the spool for one turn of the handle and accordingly does retrieve the line faster. However, fishing contests almost universally stipulate single action reels, and the present invention is therefore disclosed in conjunction with such a reel.

Single action fly reels have heretofore been provided with brake mechanisms, and only slight variations of the concept disclosed in U.S. Pat. No. 2,059,763 have been employed, without major modification, by many reel manufacturers for several decades.

Tried and true though this construction is, it does possess several features on which improvement is desired. First, because adjustment of the brake is most effectively done prior the actual cast, the fisherman is required to overcome the brake resistance every time he strips line from the spool. Resistance offered by the brake in this situation can be ruinous to the critical timing of the brake in this situation can be ruinous to the critical timing of the back cast-pause-forward cast sequence required to cast the fly if the fisherman attempts to strip line from the spool during the casting process. Conversely, having no brake is equally undesirable because the spool can overrun as line is being stripped therefrom. Overrun is the term given to rotation of the spool beyond that required for the amount of line removed, and it results in the fisherman's anathema—the backlash.

Although it would be desirable to be able to reduce the brake resistance to a selected minimum for stripping line during the cast, with prior known adjusting mechanisms it is not possible thereafter quickly and effectively to readjust the brake to a critical preselected setting at which the braking resistance will be in balance with the rod, line, leader, tippet, fly being used and the type fish being sought. Critical preselection of the brake is imperative not only when using ultra fine tippets but also with heavier tippets when fly fishing for those fish known for their spirited fight. For example, it is commonplace for the noteworthy salt-water speedster, the bone fish, to make runs of 350 to 400 feet. When one considers the formidable load which such a fish is dragging merely by way of the line and the preset drag, it is readily apparent that something would break if the fish were not permitted to run against a thoughtfully preselected brake resistance Second, the most favored prior art construction, while it provides for selective adjustment, does so only through a range fixed into the reel at the time of manufacture. However, to provide desirable sensitivity it has been found that the range of adjustment must be relatively narrow. Accordingly, with prior known constructions reel manufacturers are faced with the dilemma of choosing a construction that provides sensitive brake adjustment over a relatively narrow range or course adjustment of the brake over a wide range.

Third, most prior art constructions require arduous manipulation of a screw head, or the like, often partially obscured by a guard, to vary the braking resistance.

SUMMARY OF THE INVENTION

It is, therefore, an object of the present invention to provide a mechanism which provides precise and selective adjustment of the brake resistance in a fly fishing reel.

It is another object of the present invention to provide a mechanism, as above, by which the brake resistance is indexed for rapid, selective adjustment.

It is a further object of the present invention to provide a mechanism, as above, by which the range of the resistance offered by the brake may be preselected by the fisherman and precise adjustment of the brake resistance may be thereafter accomplished within the range selected.

These and other objects which will become apparent in the following specification are accomplished by means hereinafter described and claimed.

In general, a mechanism embodying the concept of the present invention for adjusting the brake resistance applied to the line spool of a fly reel is constructed to vary the application of the pressure force applied to actuate the brake. The brake mechanism receives this pressure force through a reaction surface, and the force is provided by a thrust means spaced from and opposed to the reaction surface. A wedge means is interposed between the thrust means and the reaction surface to transmit pressure force supplied by the thrust means against the reaction surface.

A control means is operatively connected to the wedge means in order to vary the span thereof and thereby provide selective application of pressure against the reaction surface. To vary successive spans of a circular wedge means, recurved depressions of progressively varied depths may be provided in the periphery of the circular wedge means. However, in order for such a wedge means to transmit concomitantly varied pressure force from the thrust means to the reaction surface, it is necessary that the wedge means be floatingly mounted—i.e., shiftable along an axis extending between the thrust means and the reaction surface.

The thrust means presents a yielding resistance the range of which is also capable of preselection.

One preferred embodiment is shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 1 is a side elevation of a fly reel embodying the concept of the present invention mounted on the reel seat of a conventional fly rod;

FIG. 2 is an enlarged vertical section taken substantially on line 2-2 of FIG. 1;

DESCRIPTION OF THE PREFERRED EMBODIMENT

Figure 3:
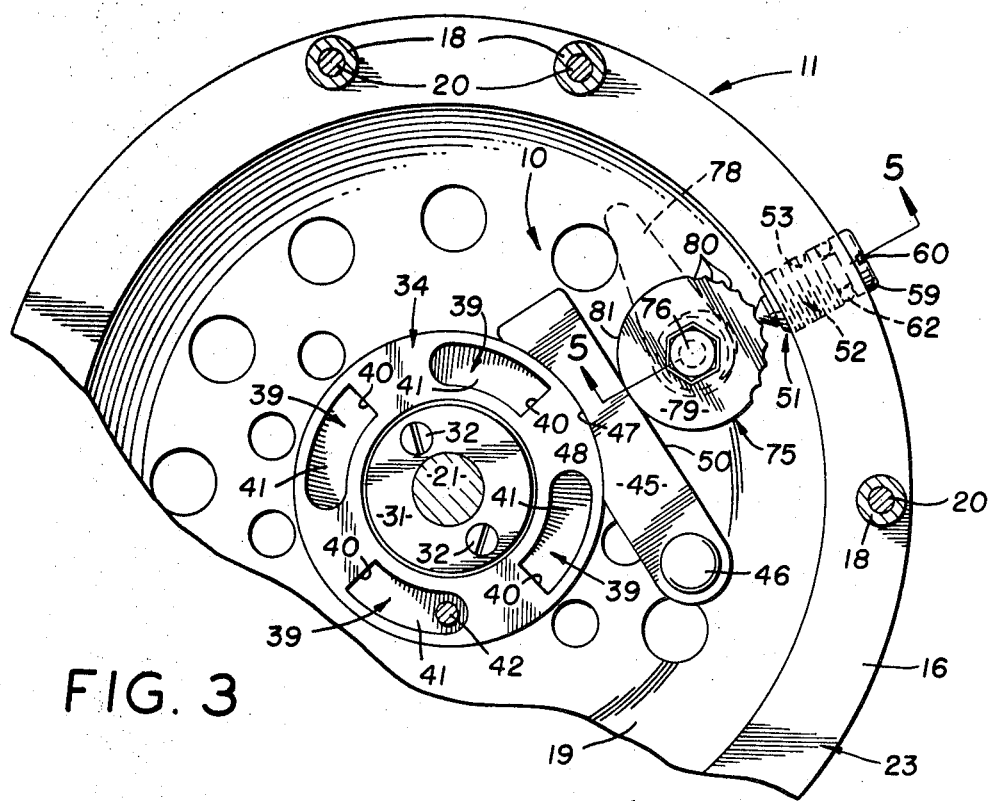
FIG. 3 is a further cross section taken substantially on line 3-3 of FIG. 2 depicting the brake adjusting mechanism in elevation.

Referring more particularly to the drawings, a brake adjusting mechanism, indicated generally by the numeral 10, is incorporated in a single action fly reel 11. The reel 11 is selectively mountable on the reel seat 12 of a fly rod by the foot 13 thereon in the customary fashion.

The foot 13 is rigidly secured to a cross plate 14 which may comprise one, or more, fixed pillars. Annular, spaced rings 15 and 16 are attached to, and extend transversely outwardly from, the cross plate 14. The rings 15 and 16 are stabilized by peripherally spaced pillars 18 extending therebetween, and, as shown in FIG. 2, the rings 15 and 16 are positioned on the left and right, respectively. For convenience of description the ring 15 will designate the front of the reel and the ring 16 the back.

A back plate 19 is secured to the back ring 16. It may be integral therewith, as shown, or it may be a separate member attached thereto as by the screws 20 which secure the ring 16 to the cross plate 14 and pillars 18. The stub shaft 21 is nonrotatably affixed to, and extends perpendicularly outwardly from, the nave 22 of the back plate 19. The nave 22 is located in the central portion of the back plate 19 so that the shaft 21 will extend concentrically of the rings 15 and 16. The general assemblage of the cross plate 14, rings 15 and 16, pillars 18, back plate 19 and shaft 21 forms the housing, or frame, 23 of the reel 11.

The shaft 21 forms an axle on which the line spool 24 is rotatably mounted. Front and rear flanges 25 and 26, respectively, extend radially outwardly from the hub 27 of the line spool 24 in alignment with the front and rear rings 15 and 16. The usual knob, or handle, 28 is secured to the outer surface of the front flange to provide a means for selective rotation of the spool 24 on the axle shaft 21. The spool 24, which is preferably interchangeable, is slidable axially along the axle shaft 21 within the front ring 15 and selectively maintained in operative position by a latch 29 biasingly receivable within a groove 30 adjacent the outer extent of the shaft 21.

At the base of the shaft 21, adjacent the back plate 19, an anchor plate 31 is secured to the valve 22 by screws 32. A flange 33 extends radially of the anchor plate 31 from the axially frontal portion thereof to retain an annular, rotatable, brake drum 34.

A plurality of shallow notches 35 are provided in the axially rearmost wall of the brake drum 34. The notches 35 are arranged in a circle to receive a click pawl 36 that is reciprocally mounted in tubular housing 37 secured to the back plate 19. A light spring 38 biases the pawl 36 against the rearmost wall of the drum 34, and the circle of notches 35, to provide a click mechanism that indicates when line is being withdrawn, as disclosed in U.S. Pat. No. 2,059,765.

The axially frontal surface of the brake drum 34—i.e., that surface adjacent the rear flange 26 of the line spool 24—is provided with a plurality of arcuate cam slots 39 (FIG. 3). One circumferential end of each slot 39 presents an abrupt stop wall 40, and the axially directed base presents a sloping cam surface 41 that inclines axially outwardly to the frontal surface of the drum 34. A spring-biased, axially reciprocal pawl pin 42 (FIG. 2) mounted on the spool 24 between the hub 27 and the cylindrical arbor 43 on which the line is wound cooperates with the cam slots 39 to permit relative rotation of the line spool 24 with respect to the brake drum 34 when the spool 24 is being rotated to retrieve line and to prohibit such relative rotation when line is being stripped from the spool. This occurs because of the orientation of the cam slots 39. When the spool is rotated to retrieve line, the pin 44 will ride along the cam surfaces 41 and out of the slots 39, whereas, when line is being stripped from the spool it will rotate in the opposite direction. Rotation of the spool in that direction brings the pin 44 against one of the stop walls 40 and assures that the brake drum 34 will rotate with the spool.

As best shown in FIG. 3, a brake arm 45 is pivotally mounted from a stub shaft 46 extending forwardly from the back plate 19 and has a curved brake shoe surface 47 that bears against the rim 48 of the brake drum 34. The braking action imparted by the shoe means 47 against the drum 34 resists that rotation of the spool imparted when the line is being stripped therefrom and is intended to exert a drag upon the fish when its run withdraws line.

The fly reel as heretofore described is well known to the art. However, the adjusting mechanism 10 by which the brake shoe surface 47 is selectively pressured against the rim 48 of the drum 34 finds no precedent in the prior art.

That side of the brake arm 45 opposite the brake shoe surface 47 presents a reaction surface 50. Opposed to, and spaced apart from, the reaction surface 50 is a thrust means 51. The thrust means 51 has a barrel means in the form of a set screw 52 that is received in a bore 53 which extends radially through a boss 54 at the juncture of the ring 16 and back plate 19. The bore 53 is threaded, as at 55, matingly to receive the threads 56 on the exterior of the shank portion 58 of the barrel means 52.

The head portion 59 of the set screwlike barrel means 52 is provided with an engaging means, such as slot 60, by which the radial position of the barrel means 52 within bore 53 may be selected. An annular recess 61 is provided between this shank and head portions 58 and 59, respectively, to receive an interference lock, such as O-ring 62, by which the barrel means 52 is maintained at the selected radial position. The interference lock operates by the elastic flow of the O-ring lockingly against threads 55.

The shank portion 58 has a cuplike cavity 63 (FIG. 5) that extends axially of the barrel means 52 and communicates with a concentric guide bore 64 that opens through the base 65 of the cavity 63. A plunger 66 is slidably received within the cavity 63 so as to present a conical tip 68 directed radially inwardly with respect to the reel 11 in opposition to the reaction surface 50 on the brake arm 45. Extending outwardly from the plunger 66 in a direction opposite the conical tip 68 is a stem 69 that is slidably received within the guide bore 64. Biasing means in the form of a selected number of O-rings 70 embrace the stem 69 and fixedly engage the cylindrical surface that defines the bounding wall of the cavity 63.

A wedge means 75 is positioned between the reaction surface 50 and the thrust means 51 to transmit the force supplied by the thrust means 51 against the reaction surface 50. The wedge means 75 is secured to a shaft 76 which extends through the back plate 19 and presents a control lever 78. Movement of the control lever selectively varies the span of the wedge means 75 interposed between the thrust means 51 and the reaction surface 50 so as to control the pressure applied against the reaction surface 50 by the force generated from the thrust means 51.

Figure 4:
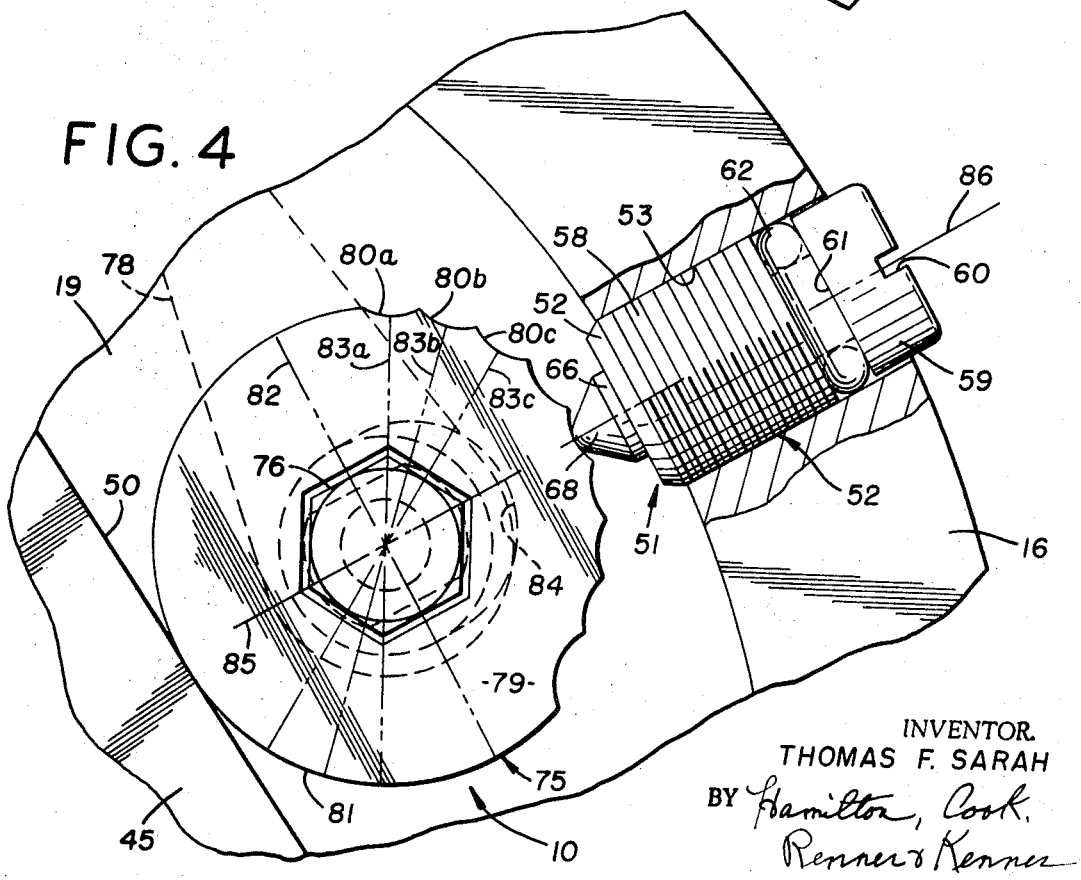
FIG. 4 is an enlarged area of FIG. 3 depicting the brake adjusting mechanism and particularly the preferred wedge means; and, FIG. 5 is an enlarged cross section taken substantially on line 5-5 of FIG. 3.

As shown in FIGS. 3 and 4 the preferred wedge means 75 comprises an annular disc 79 with a plurality of reversely curved depressions 80 concavely recessed into at least a portion of the arcuate peripheral wall 81 of the disc 79. The depressions 80 are circumferentially spaced and are of progressive depths so that the span from the base of each successive depression to a point on the peripheral wall 81 diametrically thereto is of progressively different length—the differential between successive spans being equal to the differential between the depth of successive depressions 80.

For example, if the basic diameter 82 of the disc is 0.532 inches, the depression 80a could be 0.003 inches in order that the span 83a would equal 0.529 inches. By progressively increasing the depth of each successive depression 80b, 80c, etc. by 0.003 inches the spans 83b, 83c, etc. would be correspondingly reduced to 0.526, 0.523, etc.

Accordingly, if the tip 68 of plunger 66 is received within depression 80a, a point on the peripheral wall 81 diametrically opposed to depression 80a, will be engaged with the reaction surface 50 on brake arm 45, and the brake shoe surface 47 will supply a pressure against the rim 48 of the brake drum 34 concomitant with the selected location of the barrel means 52 within bore 53 and the number and size of the O-rings 70 embracing stem 69. Should, however, the tip 68 of plunger 66 be received in depression 80b, a point on the peripheral wall 81 diametrically opposed to depression 80b will be engaged with the reaction surface 50, and the wedging span between the plunger 66 of thrust means 51 and the reaction surface 50 would have been reduced so that, with the barrel means 52 retained in the same position within bore 53 as was noted in the example wherein the plunger 66 was received within depression 80a, and with the number and size of O-rings 70 also remaining the same, the resulting braking pressure applied by the brake shoe surface 47 against the rim 48 of the brake drum 34 will have been incrementally reduced. As the plunger is received in successively deeper depressions 80 the braking pressure will be reduced by correspondingly successive increments. However, in order for such incremental variations to be effected with a disc 79 having an arcuate peripheral wall 81, the disc 79 must be floatingly mounted. As shown in FIGS. 4 and 5, the shaft 76 on which the disc 79 is carried is rotatably received within a slotted journal aperture 84 provided in the back plate 19. The elongate, or major, axis 85 of the journal aperture 84 is disposed in parallel relation with the axis 86 of bore 53. Accordingly, as the disc 79 is rotated, it may adjust radially of the brake drum 34 in response to the pressure applied thereagainst by the thrust means 51.

In the preferred embodiment nine depressions are spaced over approximately 135° of the arcuate peripheral wall 81. This has been found to provide an ample variation in the brake adjustment for most fishing conditions. Moreover, the interaction of the tip 68 of plunger 66 with successive depressions 80 provides both an audible and tactile indication of a change in the brake setting. As such, if the fisherman preselects the proper brake resistance for the line leader and tippet being used and yet desires a somewhat lesser drag during the cast, he merely makes a mental note of the number of "clicks" required to reduce the braking resistance to that desired for stripping the line, and, upon completion of the cast, resets the preselected fishing brake by reversing the adjustment the same number of "clicks." He thus has an index for rapid and precise adjustment of the brake.

Moreover, should the fisherman wish to adjust the range through which the nine station adjustment depicted is operative, he merely screws the thrust means radially inwardly to select a range of increased drag resistance or screws it radially outwardly to select a range of reduced braking resistance. Additional variations in the range through which the station adjustments are operative can be secured by varying the number and size of the O-rings 70 employed in the thrust means 51.

A mechanism constructed according to the concept of the present invention thus provides rapid, precise and indexed brake adjustment for a fly fishing reel and otherwise accomplishes the objects of the invention.

I claim:

1. A brake adjusting mechanism for a fishing reel having a frame, a line spool rotatably mounted in said frame, a brake means to resist rotation of said line spool in at least one direction with respect to the frame, said brake means being adjustable by selective variation of the pressure applied thereto, the adjusting mechanism by which said pressure is selectively varied comprising, a reaction surface on said brake means to receive a brake actuating pressure force, a thrust means to provide said pressure force, said thrust means mounted in opposition to and spaced from said reaction surface, wedge means of selectively variable span interposed between said thrust means and said reaction surface to transmit pressure force therebetween, an aperture in said frame, said wedge means carried on a shaft means mounted in said aperture, control means operatively connected to said wedge means selectively to vary the span of said wedge means between said thrust means and said reaction surface concomitantly to vary the pressure force applied against said reaction surface, said aperture having an elongate axis along which said shaft is movable to permit adjustment of the location of said shaft as the span of said wedge means is varied between said thrust means and said reaction surface.

2. A brake adjusting mechanism, as set forth in claim 1, in which the wedge means employs a disc having successively varied diametric spans, and said control means is secured to said shaft means selectively to rotate said disc.

3. A brake adjusting mechanism, as set forth in claim 2, in which the elongate axis of said journal aperture is oriented to extend generally between said thrust means and said reaction surface.

4. A brake adjusting mechanism, as set forth in claim 3, in which the thrust means comprises a plunger means reciprocally mounted in the reel frame said plunger means engaging the peripheral wall of said disc and baising means urging said plunger against said disc.

5. A brake adjusting mechanism, as set forth in claim 4, in which a barrel means is mounted in said frame and said plunger means is reciprocal therein and in which means are provided selectively to position said barrel means axially of said disc to predetermine the range through which the brake is adjustable.

6. A brake adjusting mechanism, as set forth in claim 5, in which resilient blocking means retain said barrel means in the selected position.

7. A brake adjusting mechanism, as set forth in claim 5, in which means are provided selectively to vary said biasing means.

8. A brake adjusting mechanism, as set forth in claim 5, in which said plunger is reciprocally slidable in a cavity within said barrel means, said cavity having a base wall, said plunger having a stem, a guide bore opening through the base wall of said cavity, said stem being slidably received in said guide bore, said biasing means comprising O-rings embracing said stem and compressible between said plunger and said base wall.

UNITED STATES PATENT OFFICE
CERTIFICATE OF CORRECTION

Patent No. 3,574,339              Dated April 13, 1971

Inventor(s) Thomas F. Sarah

It is certified that error appears in the above-identified patent and that said Letters Patent are hereby corrected as shown below:

Column 1, lines 35 and 36, cancel "brake in this situation can be ruinous to the critical timing of the". Column 3, line 30, "valve" should read -- nave --. Column claim 4, line 3, insert a comma (,) after "frame"; line 4, "baising" should read -- biasing --. Column 6, claim 5, line 3, insert a comma (,) after "therein". Column 5, line insert a comma (,) after "line".

Signed and sealed this 10th day of October 1972.

(SEAL)
Attest:

EDWARD M. FLETCHER, JR.           ROBERT GOTTSCHALK
Attesting Officer                  Commissioner of Patents